United States Patent [19]

Isobe

[11] 4,328,882
[45] May 11, 1982

[54] REAR HUB FOR A BICYCLE

[75] Inventor: Mitsuhide Isobe, Toyonaka, Japan

[73] Assignee: Shimano Industrial Company Limited, Osaka, Japan

[21] Appl. No.: 132,414

[22] Filed: Mar. 21, 1980

[51] Int. Cl.³ ..................... F16D 41/34; F16D 11/08
[52] U.S. Cl. ..................................................... 192/64
[58] Field of Search ............................ 192/64; 74/69

[56] References Cited

U.S. PATENT DOCUMENTS

| | | | |
|---|---|---|---|
| 2,394,112 | 2/1946 | Schwinn | 192/64 |
| 3,182,529 | 5/1965 | Schwerdhofer | 192/64 |
| 3,554,340 | 1/1971 | Shimano et al. | 192/64 |
| 4,102,215 | 7/1978 | Nagano et al. | 192/64 |
| 4,154,123 | 5/1979 | Nagano | 192/64 |
| 4,226,317 | 10/1980 | Nagano et al. | 192/64 |

Primary Examiner—C. J. Husar
Assistant Examiner—Conrad Berman
Attorney, Agent, or Firm—Stevens, Davis, Miller & Mosher

[57] ABSTRACT

An improved rear hub for a bicycle, comprises: a tubular extension provided at a hub shell having a pair of first and second hub flanges and extending axially outwardly of the first hub flange, the extension carrying an inner member sleeved onto the outer periphery of the extension and fixed thereto; a plurality of through bores formed at an axially intermediate portion of the inner member; and pawl accommodating chambers which are formed by the through bores and the outer periphery of the extension and within which pawls are accommodated and retained, so that a cylindrical outer member having at least one sprocket is supported to the inner member in a relation of being unidirectionally rotatable through the pawls and ratchet teeth provided at the inner periphery of the outer member.

5 Claims, 6 Drawing Figures

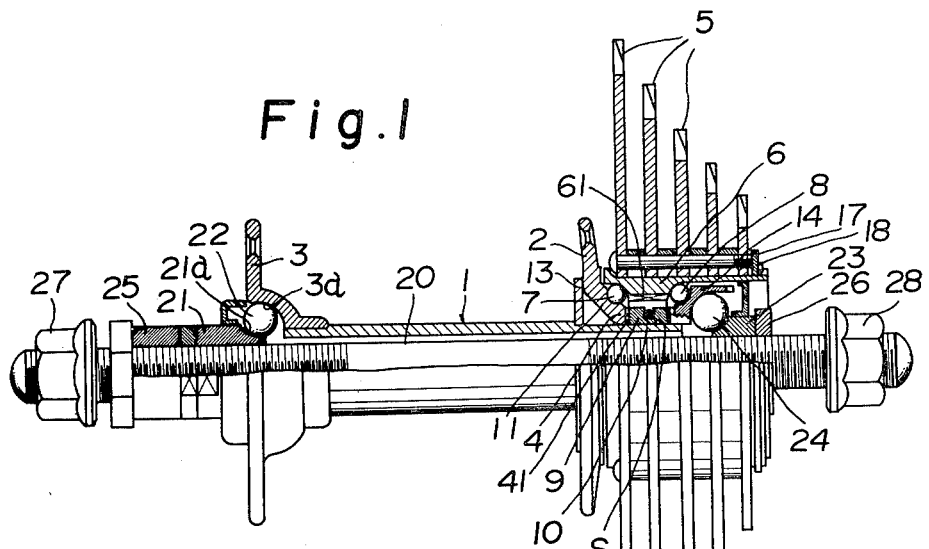
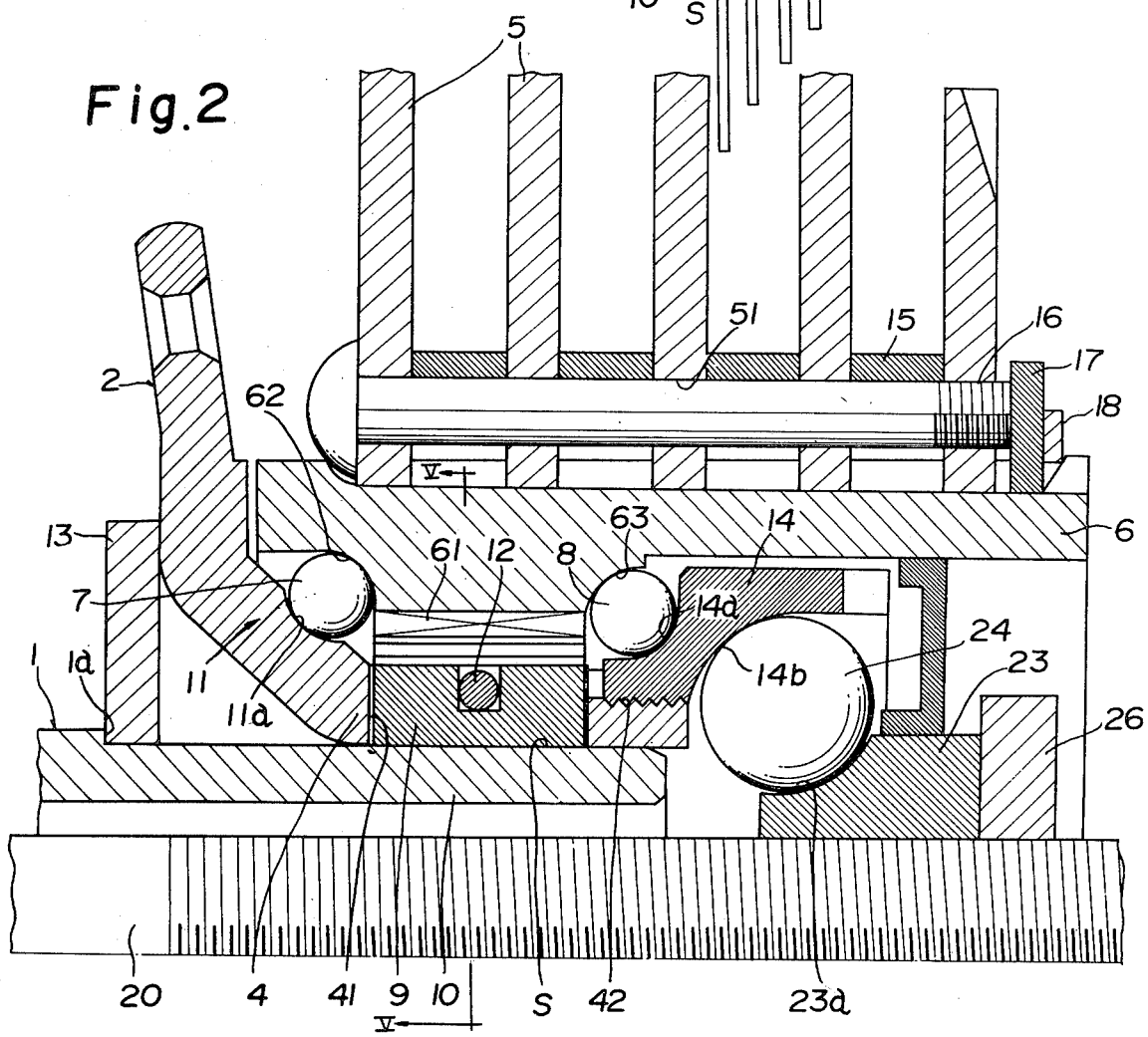

REAR HUB FOR A BICYCLE

BACKGROUND AND SUMMARY OF THE INVENTION

This invention relates to a rear hub for a bicycle, which is provided with an inner member fixed to a hub shell having at both axial ends thereof a pair of hub flanges, the inner member unidirectionally rotatably supporting an outer member having at least one sprocket.

Generally, this kind of rear hub has an inner member mounted on one axial end of the hub shell axially outwardly fron one of the hub flanges. The outer member having the sprocket is mounted to surround the inner member so as to be freely rotatable therewith. Ratchet teeth are provided at the inner periphery of the outer member, and pawls engageable with the ratchet teeth are supported on the outer periphery of the inner member, so that the ratchet teeth and pawls comprise a unidirectionally rotary transmission which allows the outer member to unidirectionally freely rotate.

Conventionally, the pawls supported on the outer periphery of the inner member are accommodated in chambers formed by recessing the outer periphery of the inner member. The cutting work required to form the recesses is troublesome when leads to complicated machining of the inner member. As a result, the hub is expensive to produce.

In the light of the aforesaid problem, this invention has been designed. An object of the invention is to provide a rear hub having easily machined pawl accommodating chambers to considerably decrease its manufacturing cost.

This invention is characterized in that a hub shell having a pair of first and second hub flanges is provided with a tubular extension extending axially outwardly of the first hub flange, an inner member is sleeved onto the extension and fixed thereto, and a plurality of through bores are formed at an axially intermediate portion of the inner member, so that the pawl accommodating chambers are formed with the through bores and the outer periphery of the extension.

The present invention has been designed around the fact that a pressing operation for making the through bores is simpler than the conventional cutting work for recessing the outer periphery of the inner member. The invention is so constructed that the inner member is made tubular and has the through bores, and the tubular extension is formed at the hub shell and is used, together with the through bores, to form the pawl accommodating chambers. Hence, the invention overcomes the problem associated with the conventional rear hub of having the pawl accommodating chambers formed by complicated and expensive cutting work.

In the rear hub of the invention, the inner member, which is sleeved onto the extension and reinforced therewith, can be formed of relatively thin pipe material, thereby facilitating the formation of the through bores. Also, an inner member integral with first hub flange can be formed by use of one metallic plate in a constriction process. As a result, the rear hub of the invention is even less expensive to produce.

These and other objects and novel features of the invention will be more apparent from the following description, reference being had to the accompanying drawings, wherein a preferred form of the present invention is clearly shown.

BRIEF DESCRIPTION OF THE DRAWINGS

FIG. 1 is a partially cutaway front view of a rear hub of the invention,

FIG. 2 is a partially enlarged sectional view thereof,

DETAILED DESCRIPTION OF THE INVENTION

Figure 3:
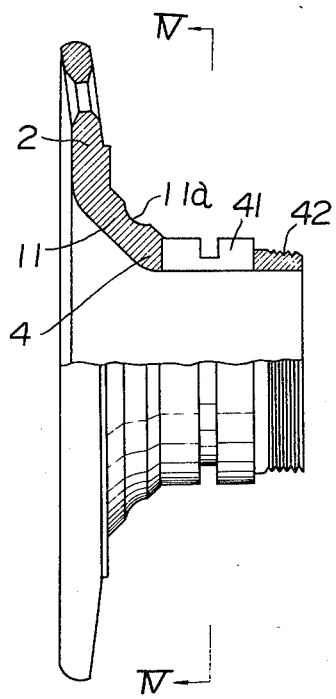
FIG. 3 is a partially cutaway enlarged front view of an inner member integral with a first hub flange.
Figure 4:
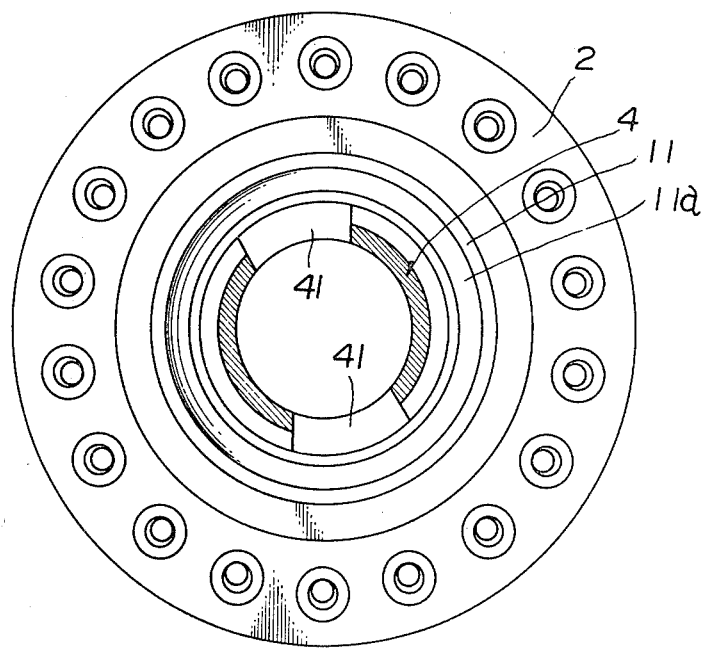
FIG. 4 is a sectional view taken on the line IV—IV in FIG. 3.

A rear hub for a bicycle of the invention, as shown in FIG. 1, basically comprises a tubular hub shell 1 having a pair of first and second hub flanges 2 and 3, an inner member 4 fixed to the hub shell 1, an outer member 6 supported rotatably with respect to the inner member 4 and having at the outer periphery at least one sprocket 5 (five sprockets shown in FIG. 1), a pair of first and second bearings 7 and 8 carrying the outer member 6 rotatably to the inner member 4, and a unidirectionally rotary transmission comprising pawls 9 supported to the outer periphery of inner member 4 and ratchet teeth formed at the inner periphery of outer member 6.

The hub shell 1, as shown in FIG. 1, is formed of a metallic pipe and provided at both axial ends with the first and second hub flanges 2 and 3 separate from the hub shell 1, respectively.

At one axial end of the hub shell 1 is formed a tubular extension 10 extending axially outwardly of the first hub flange 2. The inner member 4 is made tubular to have an inner diameter slightly larger than an outer diameter of the extension 10 and is fixedly sleeved thereon in press-fit.

The inner member 4 and first hub flange 2 shown in FIG. 1, are formed integrally of one metallic plate as shown in FIG. 3. The one metallic plate is subject to a constriction process to facilitate this integral formation. A connection portion 11 of a conelike shape integrates the first hub flange 2 with tubular inner member 4, and is provided at the outer periphery with a ball race 11a (see FIG. 2) for the first bearing 7.

The inner member 4, as shown in FIG. 3, is provided at an axially intermediate portion with a plurality of through bores 41 (usually two bores) which perforate radially of the inner member 4 and which are disposed circumferentially thereof at regular intervals. Inner member 4 also has a screw thread 42 at the outer periphery axially outward from the through bores 41. The construction process on the inner member 4 facilitates the formation of through bores 41 by a pressing operation.

Figure 5:
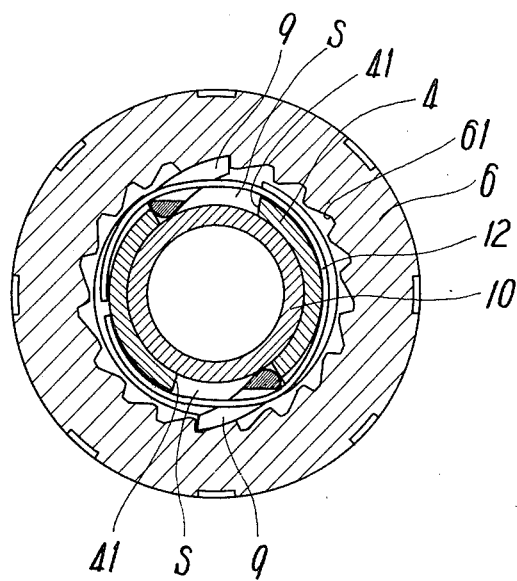
FIG. 5 is a sectional view taken on the line V—V in FIG. 2.
Figure 6:
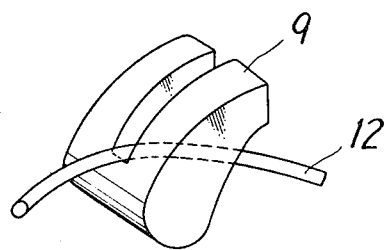
FIG. 6 shows an enlargement of a portion of a unidirectional transmission.

The inner member 4 integral with the first hub flange 2, as shown in FIGS. 1 and 2, is press-fit onto the outer periphery of extension 10 at the hub shell 1 and is fixed thereto, such that the first hub flange 2 is kept in position at the hub shell 1. Also, the through bores 41 together with the outer periphery of extension 10 form the pawl accommodating chambers S at the inner member 4 respectively. The chambers S accommodate therein the pawls 9 which are held together with a C-shaped ring 12 in a known manner such that pawls 9 are engageable with or disengageable from the ratchet teeth 61, as shown in FIGS. 5 and 6 the pawls 9 and ratchet teeth 61 constituting the unidirectionally rotary transmission.

The hub shell 1, as shown in FIGS. 1 and 2, is also provided at the extension 10 with an annular stepped portion 1a. An annular washer 13 is fit onto the extension 10 to abut against the stepped portion 1a, so that the first hub flange 2, when the iner member 4 is press-fit onto the extension 10, abuts at the axially inner surface against the washer 13, thereby ensuring that the inner member 4 and first hub flange 2 are restrained from axially inwardly moving, thus keeping the hub flange 2 in position. The washer 13 is not inevitably necessary, and alternatively a stepped stopper may be formed halfway along the extension 10 to abut against one axial end of the inner member 4.

Referring to FIGS. 1 and 2, reference numeral 14 designates a cylindrical bearing member. The cylindrical bearing member 14 is screwable with a screw thread 42 at the inner member 4 and has at the outer and inner surfaces ball races 14a and 14b respectively.

The outer member 6, as shown in FIG. 2, is provided at its inner periphery with a pair of ball races 62 and 63, in addition to the ratchet teeth 61, the ball race 62 being disposed axially inwardly from the ratchet teeth 61 and opposite to the ball race 11a formed at the outer periphery of connecting portion 11 which connects the inner member 4 and first hub flange 2, the ball race 63 being disposed aixally outwardly from the ratchet teeth 61 and opposite to the ball race 14a at the outer periphery of cylindrical bearing member 14. First and second ball bearings 7 and 8, are interposed between the opposite ball races 11a and 62 and between the opposite ball races 14a and 63 to thereby support the outer member 6 unidirectionally freely rotatably to the inner member 4.

The sprockets 5 may be integral with the outer member 6, or as shown in FIGS. 1 and 2 separate from the outer member 6. Collars 15 are interposed between each sprocket 5 and bolts 16 perforate bores 51 formed at the sprockets 5 respectively, the bolts 16 being screwed with threaded bores 51 at the smallest diameter sprocket 5 to thereby assemble all the sprockets. The assembly of sprockets 5 is fit onto the outer periphery of outer member 6 and fixed thereto through a ring plate 17 and snap ring 18.

Referring again to FIGS. 1 and 2, the hub shell 1 is supported at its one axial side freely rotatably to the hub shaft 20 through a ball bearing 22 interposed between a ball race 3a at the second hub flange 3 and a ball race 21a at a bearing member 21 screwable with one axial end of hub shaft 20. The hub shell 1 also is supported at the other axial end to the hub shaft 20 through a ball bearing 24 interposed between the ball race 14b at the cylindrical bearing member 14 and a ball race 23a at a bearing member 23 screwable with the other axial end of hub shaft 20.

In addition, reference numerals 25 and 26 designate lock nuts for the bearing members 21 and 23. Reference numerals 27 and 28 designate nuts for fixing the hub shaft 20 to the bicycle frame (not shown).

As an alternative construction to that described above, the inner member 4, which is integral with the first hub flange 2, may be made separate therefrom. However, the inner member 4 and the first hub flange 2 integral therewith can simultaneously be formed of one metallic plate in a constriction process, which is advantageous in machining, simple in assembly, and larger in strength in comparison with a separate formation of these members.

As clearly understood from the above description, the inner member at the rear hub of the invention is made tubular such that the through bores 41 can easily be formed in a press-work operation, and it is easy to provide the accommodating chambers S for the pawls 9 by simply forming the through bores 41 at the inner member 4 and using the extension 10 at the hub shell 1. Hence, the inner member 4 is easily machined and inexpensively produced in comparison with a conventional inner member requiring cutting work.

Furthermore, the inner member 4 is reinforced by the extension 10 to increase its structural strength, and also is sleeved rigidly onto the extension 10 to obtain sufficient fixation strength.

While a preferred embodiment of the invention has been described using specific terms, such description is for illustrative purpose only, and it is to be understood that changes and variations may be made without departing from the spirit or scope of the invention which is defined by the following claims.

What is claimed is:

1. In a rear hub for a bicycle, which is provided with a tubular hub shell having a pair of first and second hub flanges, an inner member fixed to said hub shell, an outer member supported freely rotatably with respect to said inner member and having at least one sprocket at the outer periphery thereof, a pair of first and second bearings carrying said outer member freely rotatably with respect to said inner member, and a unidirectionally rotary transmission comprising pawls supported at the outer periphery of said inner member and ratchet teeth provided at the inner periphery of said outer member, the improvement comprising: a tubular extension provided at said hub shell and extending axially outwardly of said first hub flange, said inner member having a tubular shape and being sleeved onto the outer periphery of said extension and fixed thereto; and a plurality of through bores provided at an axially intermediate portion of said tubular inner member, said through bores of said inner member and the outer periphery of said extension forming accommodating chambers in which said pawls are retained.

2. A rear hub for a bicycle according to claim 1, wherein said inner member is integral with said first hub flange.

3. A rear hub for a bicycle according to claim 2, wherein said inner member is integral with said first hub flange through a connecting portion having a cone-like shape, said connecting portion having at the outer periphery thereof a ball race supporting said first bearing.

4. A rear hub for a bicycle according to claims 1 or 2, wherein said extension is provided with a stopper for said inner member, said stopper being sleeved onto said extension.

5. A rear hub for a bicycle according to claim 4, wherein said stopper is a washer engageable with said hub shell.

* * * * *